United States Patent [19]
Matthews

[11] Patent Number: 5,691,051
[45] Date of Patent: Nov. 25, 1997

[54] HEAT BOND SEAMING TAPE AND METHOD OF MANUFACTURE

[76] Inventor: James A. Matthews, 811 17th St., NW., Massillon, Ohio 44646

[21] Appl. No.: 551,423

[22] Filed: Nov. 1, 1995

[51] Int. Cl.⁶ .................................................. B32B 7/12
[52] U.S. Cl. .................... 428/354; 428/57; 428/58; 428/195; 428/247; 428/255; 428/343; 428/411.1; 428/500; 156/304.4
[58] Field of Search ............................ 428/195, 174, 428/192, 409, 411.1, 913, 57, 58, 247, 255, 343, 354, 500; 156/304.4

[56] References Cited

U.S. PATENT DOCUMENTS

| | | | |
|---|---|---|---|
| 3,877,959 | 4/1975 | Weiss | 427/172 |
| 3,972,768 | 8/1976 | Hill | 156/545 |
| 4,234,649 | 11/1980 | Ward | 428/255 |
| 4,416,713 | 11/1983 | Brooks | 156/64 |
| 4,483,896 | 11/1984 | Gray et al. | 428/200 |
| 4,565,728 | 1/1986 | Gray et al. | 428/200 |
| 4,610,906 | 9/1986 | Brooks | 428/102 |
| 4,749,433 | 6/1988 | Johnston et al. | 156/304.4 |
| 4,824,498 | 4/1989 | Goodwin et al. | 156/71 |
| 4,935,280 | 6/1990 | Gangi | 428/102 |
| 5,198,300 | 3/1993 | Matthews et al. | 428/354 |

FOREIGN PATENT DOCUMENTS 1282418  7/1972  United Kingdom ............ 428/62

*Primary Examiner*—William Krynski
*Attorney, Agent, or Firm*—Sand & Sebolt

[57] ABSTRACT

A heat bond seaming tape has a base formed of a strip of paper or a paper-like material and an overlying strip of an open mesh material. A plurality of transversely spaced, longitudinally extending beads of a hot melt thermoplastic adhesive material is placed on a top surface of the mesh for adhering the tape to the backs of adjacent carpet edges. A strip of a rigid thermoplastic material is sandwiched between the base strip and the strip of open mesh and extends longitudinally along the center of the strip and extends transversely across the carpet seam to prevent seam buckling. The plastic strip is formed by a plurality of separate or flexibly connected hard plastic members to enable the tape to be formed into a roll for transportation and storage. The invention also relates to the method of forming the improved heat bond seaming tape.

9 Claims, 2 Drawing Sheets

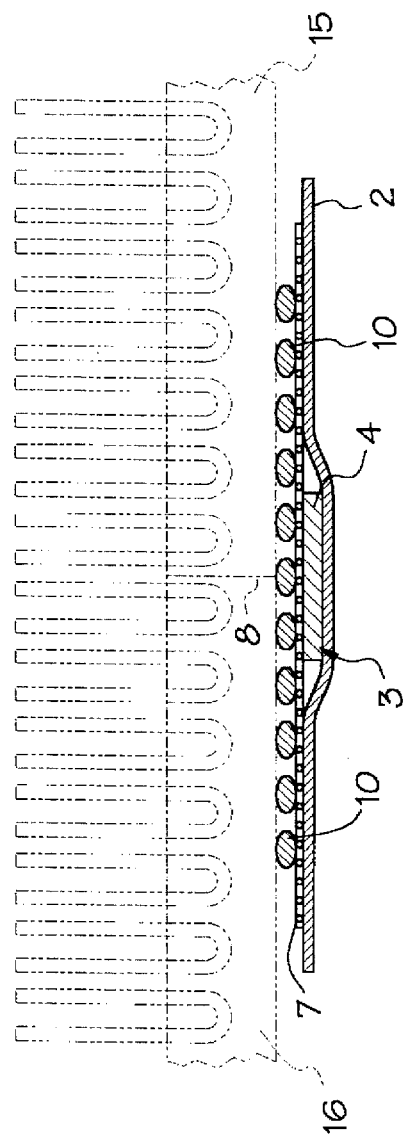
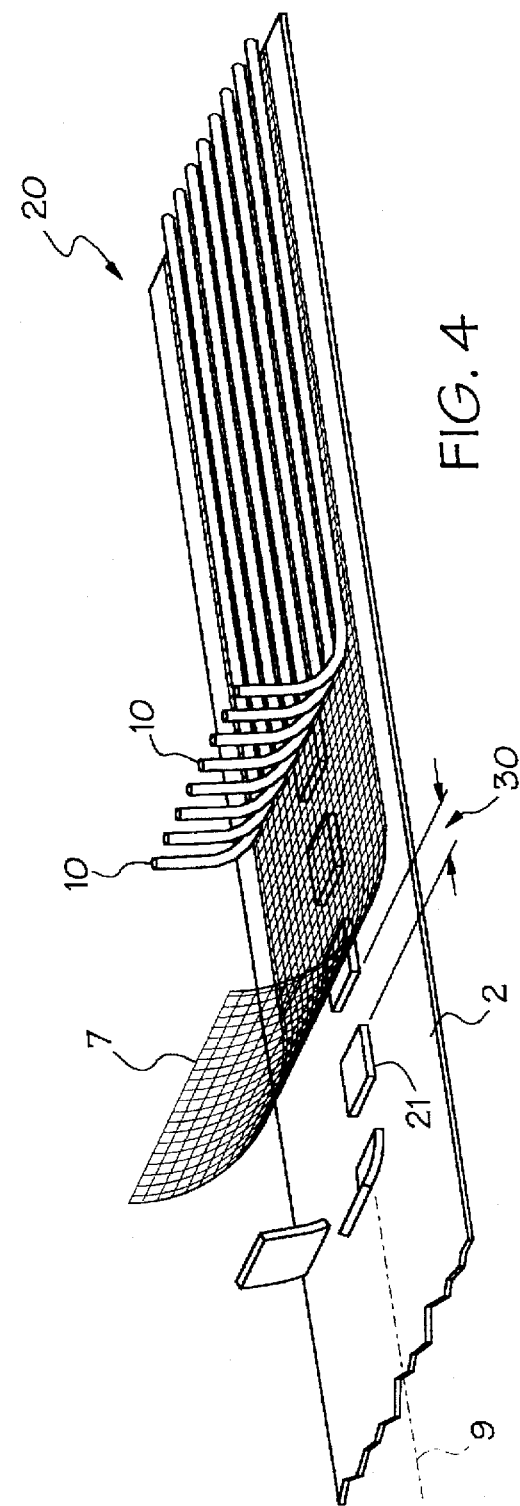

HEAT BOND SEAMING TAPE AND METHOD OF MANUFACTURE

BACKGROUND OF THE INVENTION

1. Technical Field

This invention relates generally to seam tape, and more specifically relates to a seam tape having a longitudinally extending rigid brace member formed of a plastic material which reinforces the tape, and, hence, carpet seams, against buckling, and to the method of manufacturing such a seam tape.

2. Background Information

A longstanding problem in the carpet laying service is the tendency of adjoining carpets to rise along the length of their common seam. This unsightly buckling is caused by the stresses appearing at the seam, and is a source of frequent consumer complaints.

The most widely used means for attempting to retain the abutting carpet edges in a flat disposition is the well known heat bond seam tape. The tape is a composite structure of three primary elements. Essentially, an open mesh reinforcing means, or webbing, is held in sandwiched relation between a strip of paper and a strip of thermoplastic adhesive. The purpose of the tape is to secure the seam, i.e., to prevent the seam from separating responsive to oppositely directed stretching forces imparted to the abutting carpets. It is the weakness of the open mesh, or webbing, which allows the carpets to buckle, or lift, at the seam.

Another drawback of prior art hot melt seaming tape is the tendency for the webbing to separate from the paper upon which it is adhesively mounted when the heat seaming iron is used to melt the layer of thermoplastic adhesive. This phenomenon, known in the trade as web drag, severely weakens the tape and contributes to the lifting of the adjoining carpets at the seam.

One type of seam tape of the prior art is known as pin tape, and includes a plurality of metallic bracing members disposed in sandwiched relation to the paper base and the webbing. The braces have upstanding teeth with which to grab the carpet backing.

U.S. Pat No. 4,935,280 discloses another prior art seaming tape having reinforcing filaments of high-strength yarn such as fiberglass, synthetic fibers or metal wire woven into the mesh backing of the tape. U.S. Pat. No. 4,565,728 discloses another type of seaming tape having metal wires embedded therein for heating in order to melt the adjacent adhesive, as well as reinforcing cords of fiberglass or the like. U.S. Pat. No. 4,416,713 shows another prior art carpet seaming tape which includes reinforcing filaments formed of rayon or glass fibers which extend transversely across the width of the tapes.

Although prior art carpet seaming tapes such as those discussed above all contain reinforcements, they are in fiber form. Although such fibers may provide reinforcing to the mesh, it does not provide the required reinforcement to prevent buckling or uplifting of the carpet edges at a seam.

U.S. Pat. No. 5,198,300 eliminates many of the problems discussed above with respect to prior art hot melt seaming tapes by the use of a plurality of longitudinally spaced, transversely extending metal brace members. Although this tape has been found to be satisfactory, it is relatively time consuming and difficult to manufacture, in that the metal brace members were difficult to apply and accurately position on the tape as it was being formed.

Thus, there is a need in the carpet laying service for a seaming tape that provides lift-free seams. Furthermore, a need exists for an improved method in which such a carpet seaming tape can be mass produced relatively inexpensively, without sacrificing the advantages achieved by the tape when used in laying carpet.

SUMMARY OF THE INVENTION

The longstanding but heretofore unfulfilled need for such a seaming tape is now provided in the form of a tape having a longitudinally extending strip of a hardened thermoplastic material placed in an overlying relationship to a base sheet and underlying the webbing of the tape, which can be applied in a relatively simple and expedient manufacturing process, enabling the tape to be produced at a reduced cost than heretofore possible with other types of seaming tapes having anti-buckling features.

Therefore, the primary object of this invention to provide a seaming tape that eliminates the lifting of abutting carpets at the seam that occurs during stretching of carpet when prior art seaming tapes are used, and to an improved method of manufacturing such a seaming tape.

Another objective of the invention is to provide such a seaming tape in which the hardened plastic strip of material can be formed as a single continuous strip, and then provided with a plurality of transversely extending serrations, enabling the plastic strip to be rolled together with the other components of the seaming tape into a compact roll for shipment and subsequent use.

A still further object of the invention is to provide such a seaming tape in which the rigid plastic strip may be formed by a plurality of longitudinally spaced individual plastic members which are applied in a hot melt state on a base sheet and then allowed to cool prior to rolling the strip into a roll configuration for subsequent transportation, storage and usage.

A further object of the invention is to provide such a hot bond seaming tape and method of manufacture in which the rigid plastic strip of material can be extruded separately and cooled, and then applied to the base sheet or to the mesh sheet prior to the mesh sheet being coated with the hot melt bonding adhesive.

These objectives and advantages are obtained by the improved seaming tape of the invention which is used for connecting and joining edges of carpet at a seam, the general nature of which may be stated as including an elongated base strip of flexible sheet material; an elongated strip of rigid plastic material extending longitudinally along the base strip; an elongated strip of open mesh material extending along the base strip in an overlying relationship to said base strip and rigid plastic strip; and a thermoplastic adhesive material applied to and overlying the mesh material for bonding said mesh material and the rigid strip of plastic material to a backing of the carpet.

These objectives and advantages are further obtained by the improved method of forming a seam tape for connecting adjoining edges of carpet to reduce buckling, wherein the general nature of said method includes the steps of applying a strip of a thermoplastic material to an elongated base strip of flexible sheet material; applying an elongated strip of open mesh material along the base strip in overlying relationship to the thermoplastic material; and applying a thermoplastic hot melt adhesive to the mesh material in overlying relationship to the mesh material to form an elongated strip of the seam tape.

BRIEF DESCRIPTION OF THE DRAWINGS

Preferred embodiments of the invention, illustrative of the best mode in which applicant has contemplated applying the

Figure 1:
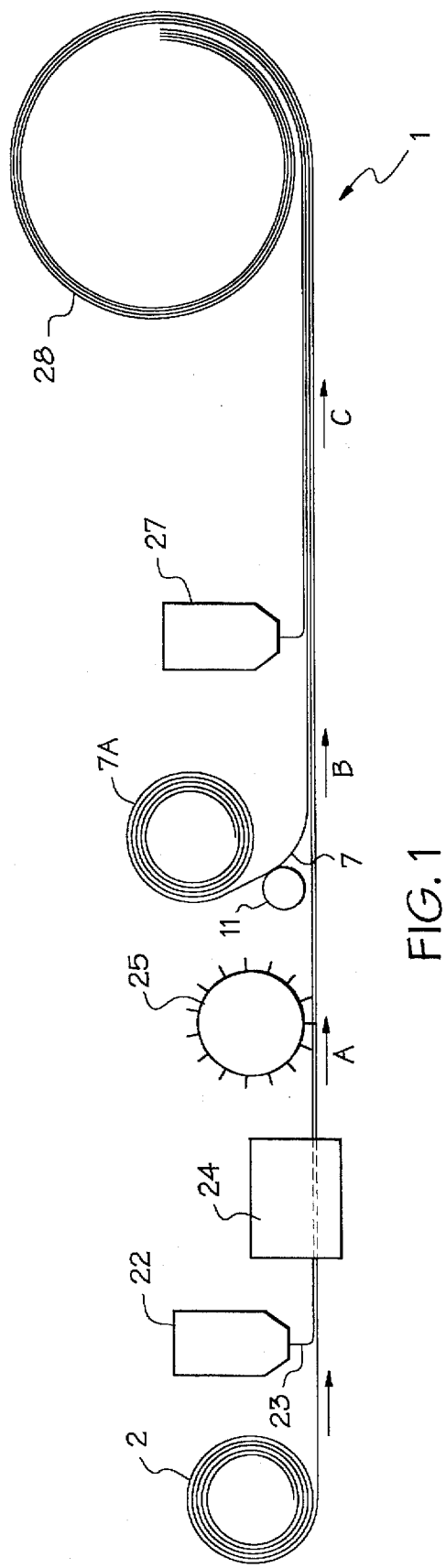

3 principles, are set forth in the following description and are shown in the drawings and are particularly and distinctly pointed out and set forth in the appended claims.

Figure 2:
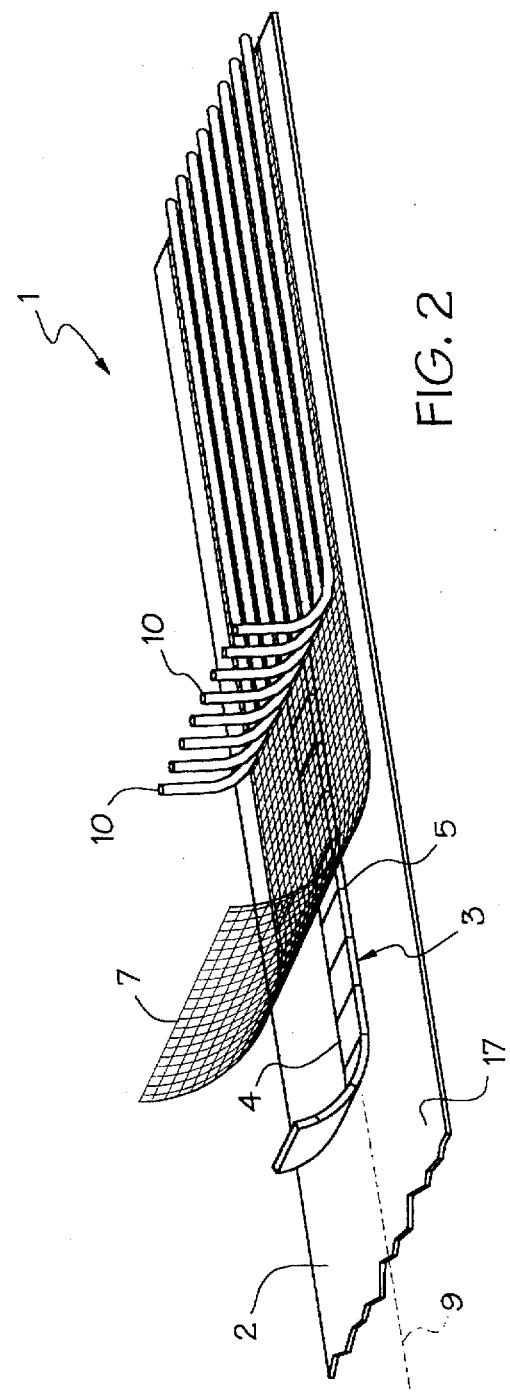

FIG. 1 is a diagrammatic view showing the sequence of steps of the method of the present invention for forming the improved heat bond seaming tape;

FIG. 2 is a fragmentary perspective view showing the seaming tape of the present invention with the individual layers thereof being peeled back to expose the underlying layer of material;

FIG. 3 is a fragmentary sectional view showing the improved seaming tape of FIG. 2 placed along the seam of two adjacent sections of carpet shown in dot-dash lines; and FIG. 4 is a view similar to FIG. 2 of a second embodiment of the heat bond seaming tape.

Similar numerals refer to similar parts throughout the drawings.

DESCRIPTION OF THE PREFERRED EMBODIMENTS

A first embodiment of the improved heat bond seaming tape is indicated generally at 1, and is shown in FIG. 2 in a fragmentary perspective condition, with the individual components being pulled back to show the underlying components.

As in conventional heat bond seaming tape, a base sheet 2 is provided, which is formed of an elongated flexible material, such as crepe paper or various types of lightweight paper, or could be formed of other materials, such as cloth, plastic, or the like, which currently is used for many seaming tape constructions. In the preferred embodiment, base sheet 2 will have a width of approximately 4 to 6 inches.

In accordance with one of the main features of the invention, a reinforcing strip of rigid plastic material, indicated generally at 3, is placed on base strip 2 and extends longitudinally therealong, preferably along the centerline of sheet 2. Reinforcing strip 3 preferably will be formed of a series of individual members 4, which are either completely separated from each other at separation lines 5, or could be flexibly connected to each other by a thin hinge-like strip of material. This construction enables the finalized seam tape to be easily rolled into a roll configuration for ease of shipment and storage without materially sacrificing the anti-buckling effect achieved thereby.

Seam tape 1 further includes a strip of open mesh webbing, indicated at 7, which extends longitudinally along base sheet 2 and overlies plastic strip 3. Mesh strip 7 is of a usual construction formed of fiberglass, nylon, polyester or other types of synthetic fibers well known for the construction of such mesh for use in the carpet seaming art. Examples of such mesh material are shown in U.S. Pat. Nos. 5,198,300, 3,877,959, and 4,565,728. In the preferred embodiment, mesh 7 will have a transverse width of approximately three to four inches. Mesh 7 preferably is coated with a usual latex adhesive or glue securing it to base strip 2.

Just as in conventional seaming tapes, it is the function of webbing 7 to keep the carpet seam 8 (FIG. 3) from separating when the carpet is stretched. Although such webbing in conventional types of seaming tape usually performs its intended function, it does so at the cost of peaking or lifting at the seams when the carpet is stretched that is often apparent when conventional tapes are used. Such buckling occurs because the webbing is flexible and responds to lateral-directed forces, such forces being generated by carpet stretching, causing buckling along its longitudinal axis of symmetry.

4

A plurality of elongated beads 10 of a thermal setting hot-melt thermoplastic adhesive are placed in a transversely spaced relationship and extend longitudinally in a spaced parallel relationship along mesh 7. Thermoplastic beads 10 can be formed of various hot-melt adhesives well known in the carpet seaming art, an example of which is set forth in U.S. Pat. No. 4,416,713. Adhesive 10 at usual ambient temperatures is non-liquid, yet liquifies upon the application of a low amount of heat, such as that generated by a carpet seaming iron or tool for bonding the tape to the backing of adjoined carpets without affecting plastic strip 3. Although adhesive 10 is shown as being applied in individually spaced beads, it is readily understood that adhesive 10 could be a continuous sheet of adhesive extending along mesh strip 7.

A protective strip (not shown) of a flexible material having an adhesive-release coating applied to its underside surface may be placed over and in contact with adhesive 10 to protect the adhesive and prevent it from bonding to other strip components when placed in a roll form, if desired. However, since adhesive 10 is solid at ambient temperatures, such a cover sheet will not be used for most applications. The protective strip is easily peeled away from adhesive 10 just prior to placing tape 1 across a carpet seam.

In the preferred embodiment, plastic strip 3, and, in particular, the individual members 4 thereof, will have a transverse width of between one-half and two inches so as to provide sufficient area on both sides of carpet seam 8 when tape 1 is secured thereto, to prevent buckling. Strip 3 preferably has a thickness range of between 0.005 inches and 0.050 inches, with the preferred thickness being 0.030 inches. This thickness has been found to provide sufficient strength to the carpet seam to prevent buckling or carpet uplift, but not substantially increasing the thickness at the seam area to provide an unsightly appearance to the carpet installation.

One type of thermoplastic material used for forming strip 3 is manufactured by ICI Acrylics, Inc., of St. Louis, Mo., which is sold and distributed under its trademark PERSPEX acrylic sheet. This material has a tensile strength of 10,300 psi; a tensile modulus of $11.2 \times 10^5$ psi; a tensile elongation of 4.2%; a flexural strength of 18,300 psi; a flexural modulus of 535,000 psi; a Rockwell Hardness (n) of 103; and an ignition temperature of 820° F.

The above is just one example of the various types of plastic materials and a particular vinyl strip which can be used for achieving the results of the invention, and need not be limited to this specific plastic.

As in conventional tapes, the novel tape of the present invention is placed in underlying relationship to the seam to be formed, as shown in FIG. 3, with its longitudinal axis of symmetry 9 lying in substantial registration with carpet seam 8 so that the stresses appearing at the seam will be evenly distributed throughout tape 1. A usual heat seaming iron (not shown) may be employed to melt thermoplastic adhesive 10 in a conventional manner so that a bond can be established between the adhesive and the respective backings 14 of abutting carpets 15 and 16, so that when adhesive 10 rehardens, the abutting carpet edges will bond with the adhesive and, hence, with each other. The applied heat is insufficient to affect the stability of plastic strip 3. Plastic strip 3, and, particularly, the individual plastic strip members 4, successfully resist peaking at the seams, even when the seam is subjected to substantial stressing, and maintains the structural integrity of tape 1.

A second embodiment of the invention is shown in FIG. 4, and is indicated generally at 20. Tape 20 is similar to tape 1 discussed above in that it includes base sheet 2, mesh strip 7 and adhesive 10. Plastic strip 3, however, is formed by a plurality of individual plastic members 21 which are placed along the longitudinal axis 9 of the strip in a spaced relationship. Reinforcing members 21 will have a transverse width of between one-half inch and two inches as do members 4 of strip 3 discussed above, and will have a longitudinal spacing, indicated at 30, preferably between one-half inch and two inches. This configuration enables strip 20 to be formed conveniently into a roll configuration, as is strip 1 discussed above, yet enable plastic members 21 to provide the required strength and resistance to prevent buckling when applied to a carpet seam, as shown in FIG. 3 and discussed above. Reinforcing members 21 preferably will be formed of the same type of thermoplastic material discussed above with respect to serrated plastic strip 3 and can be applied either in a molten state and subsequently allowed to harden, or else applied in an already hardened state, to sheet 2.

In further accordance with the invention, seaming tapes 1 and 20 can be produced more easily and at less expense than known heat bond seaming tape, especially the type of tape of U.S. Pat. No. 5,198,300, which includes the metal reinforcing braces which prevent seam peaking and buckling.

The particular method of the present invention for forming tape 1 is shown diagrammatically in FIG. 1. A roll of base sheet 2 is fed beneath an application station, indicated generally at 22, where a continuous strip of liquid thermoplastic material 23 is deposited on an and along the centerline of sheet 2. Plastic strip 23 is the same plastic material discussed above which forms reinforced seam plastic strip 3. Liquid plastic strip 23 and base sheet 2 will continue to move through a cooling or chilling zone 24 which will sufficiently cool liquid plastic 23, enabling it to begin hardening into a continuous plastic strip 3.

As base sheet 2 and semi-hardened plastic strip 3 continue to move in the direction of arrow A, it passes beneath a serrated or toothed wheel 25, or similar type of device, which forms the plurality of longitudinally spaced transversely extending serrations 5 in partially cooled and partially hardened strip 3. Serrations 5, as discussed above, enable tape 1 to be formed easily into a rolled configuration and does not materially affect the reinforcing anti-peaking effect provided thereby.

As the strip continues to advance, as shown by arrow B, mesh 7 is applied from a roll 7A thereof onto the top of partially hardened and serrated strip 3 before passing the partially formed tape through an adhesive application zone 27 which applies the individual beads 10 of a liquid thermoplastic material onto mesh 7. Preferably, mesh 7 passes over a roll 11 which applies a thin layer of a latex adhesive to mesh 7 to assist it to remain secured to base sheet 2. In the alternative, the latex adhesive may be applied directly to surface 17 of sheet 2. If desired, the partially fabricated tape then may pass through another cooling station (not shown) to completely solidify thermoplastic adhesive 10 and strip 3. The assembled tape, which will include all of the components as shown in FIG. 2, then will continue to move in the direction of arrows C, where it is then rolled into a final configured roll, indicated generally at 28, for ease of storage and shipment.

When producing the tape 20, as shown in FIG. 4, the main difference will be that the thermoplastic application equipment at station 22 will deposit individual members 21 of the thermoplastic liquid at spaced locations along the advancing base sheet 2, which will then harden and form individual members 21, as shown in FIG. 4. This will eliminate the forming of serrations by device 25 for forming the spacing between the individual hardened plastic members, enabling the composite tape to be formed into its rolled configuration.

It is also readily understood that other methods of assembling and construction of tapes 1 and 20 may be utilized for forming the improved tape. For example, hardened plastic strip 3 could be formed at a separate location and then assembled between base strip 2 and mesh 7. However, the particular method shown in FIG. 1 and discussed above is believed to enable tapes 1 and 20 and modifications thereof, to be formed in an extremely simple, inexpensive and yet highly efficient manner.

If desired, base sheet 2 could have a release coating applied to its upper surface adjacent plastic strip 3, enabling the base sheet to be removed to reduce the thickness of the final seam produced thereby without affecting the concept of the invention.

Most importantly, tape 1 and 20 each includes a reinforcing strip of plastic material, preferably separated into individual segments or members, which has a higher thermal melting point than that of the thermoplastic hot melt adhesive, which strip extends along the longitudinal centerline of the base sheet and mesh, to provide an inexpensive, easily constructed tape which prevents buckling of the carpet seams without materially increasing the thickness of the seam.

It will thus be seen that the objects set forth above and those made apparent by their preceding description are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Accordingly, the improved carpet seaming tape is simplified, provides an effective, safe, inexpensive, and efficient tape which achieves all the enumerated objectives, provides for eliminating difficulties encountered with prior tapes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved carpet seaming tape is constructed and used, the characteristics of the construction, and the advantageous, new and useful results obtained; the new and useful structures, devices, elements, arrangements, parts and combinations, and method steps are set forth in the appended claims.

I claim:

1. A seam tape for connecting adjoining edges of carpet at a seam thereof to reduce buckling of said edges along said seam, said tape including:

an elongated base strip of flexible sheet material;

an elongated strip of a rigid plastic material extending longitudinally along the base strip, said strip having a width substantially less than the width of the base strip and having a plurality of transversely extending serrations spaced along the longitudinal length of said strip enabling the seam tape to be formed into a roll configuration;

an elongated strip of open mesh material extending along the base strip in an overlying relationship to said strip of rigid plastic material; and a thermoplastic adhesive material applied to the mesh material for bonding said mesh material and the rigid plastic material to a backing of the carpet.

2. The seam tape defined in claim 1 in which the thermoplastic adhesive material is a plurality of transversely spaced beads of said adhesive material extending in a substantially parallel longitudinal direction with respect to said base strip.

3. The seam tape defined in claim 1 in which the rigid plastic material is an acrylic.

4. The seam tape defined in claim 1 in which the rigid plastic material has a transverse width substantially between one-half inch and two inches.

5. The seam tape defined in claim 4 in which the plastic material has a transverse width of approximately one and one-half inches.

6. The seam tape defined in claim 1 in which the rigid plastic material has a thickness of substantially between 0.005 inches and 0.050 inches.

7. The seam tape defined in claim 6 in which the plastic material has a thickness of approximately 0.030 inches.

8. The seam tape defined in claim 1 in which the base strip and mesh material, each has a transverse width substantially within the range of between four inches and six inches, with the width of said mesh material being equal to or smaller than the width of said base strip.

9. The seam tape defined in claim 1 in which the base strip is paper.

* * * * *